(12) United States Patent
Robertson et al.

(10) Patent No.: US 10,302,417 B2
(45) Date of Patent: May 28, 2019

(54) USE OF A LASER MEASURING SYSTEM AND A PULSE GAS FLOW TO ENABLE A FEEDBACK CONTROLLED MOLD POWDER APPLICATION

(71) Applicant: Infosight Corporation, Chillicothe, OH (US)

(72) Inventors: John A. Robertson, Chillicothe, OH (US); Ken R. Vaughn, Kingston, OH (US)

(73) Assignee: Infosight Corporation, Chillicothe, OH (US)

( * ) Notice: Subject to any disclaimer, the term of this patent is extended or adjusted under 35 U.S.C. 154(b) by 493 days.

(21) Appl. No.: 15/015,673

(22) Filed: Feb. 4, 2016

(65) Prior Publication Data

US 2016/0313113 A1    Oct. 27, 2016

Related U.S. Application Data

(60) Provisional application No. 62/152,986, filed on Apr. 27, 2015.

(51) Int. Cl.
G01B 11/06    (2006.01)
G01S 17/08    (2006.01)
G01S 17/88    (2006.01)

(52) U.S. Cl.
CPC .......... *G01B 11/0625* (2013.01); *G01S 17/08* (2013.01); *G01S 17/88* (2013.01)

(58) Field of Classification Search
CPC ...... G01B 11/0625; G01S 17/08; G01S 17/88
See application file for complete search history.

(56) References Cited

FOREIGN PATENT DOCUMENTS

JP    H02108444 A  * 10/1988
JP    2007090357 A * 4/2007 ........... B22D 11/165

OTHER PUBLICATIONS

Google translation of Japanese Patent Application Publication JP2007090357A to Akio Nagamune et al; retreived Aug. 14, 2018. (Year: 2007).*
Google translation of Japanese Patent Application Laid Open JP H02108444 to Itoyama Seji et al; retreived Aug. 14, 2018 (Year: 1988).*

* cited by examiner

*Primary Examiner* — Joseph S Del Sole
*Assistant Examiner* — John Robitaille
(74) *Attorney, Agent, or Firm* — Mueller Law, LLC; Jerry K. Mueller, Jr.

(57) ABSTRACT

Disclosed is a method of using laser sensors to measure the top surface of the granular flux powder height at the top of the continuous caster. Additionally, the laser sensor measures the height of the underlying sintered or liquid flux level absent the powder. This disclosure includes a method of utilizing a laser sensor and a gas puff to determine both the granular powder depth and the level of the underlying solid or liquid layer. The granular powder depth measurement then is utilized in a mold powder deposition system to permit feedback control so as to maintain the granular powder thickness.

3 Claims, 1 Drawing Sheet

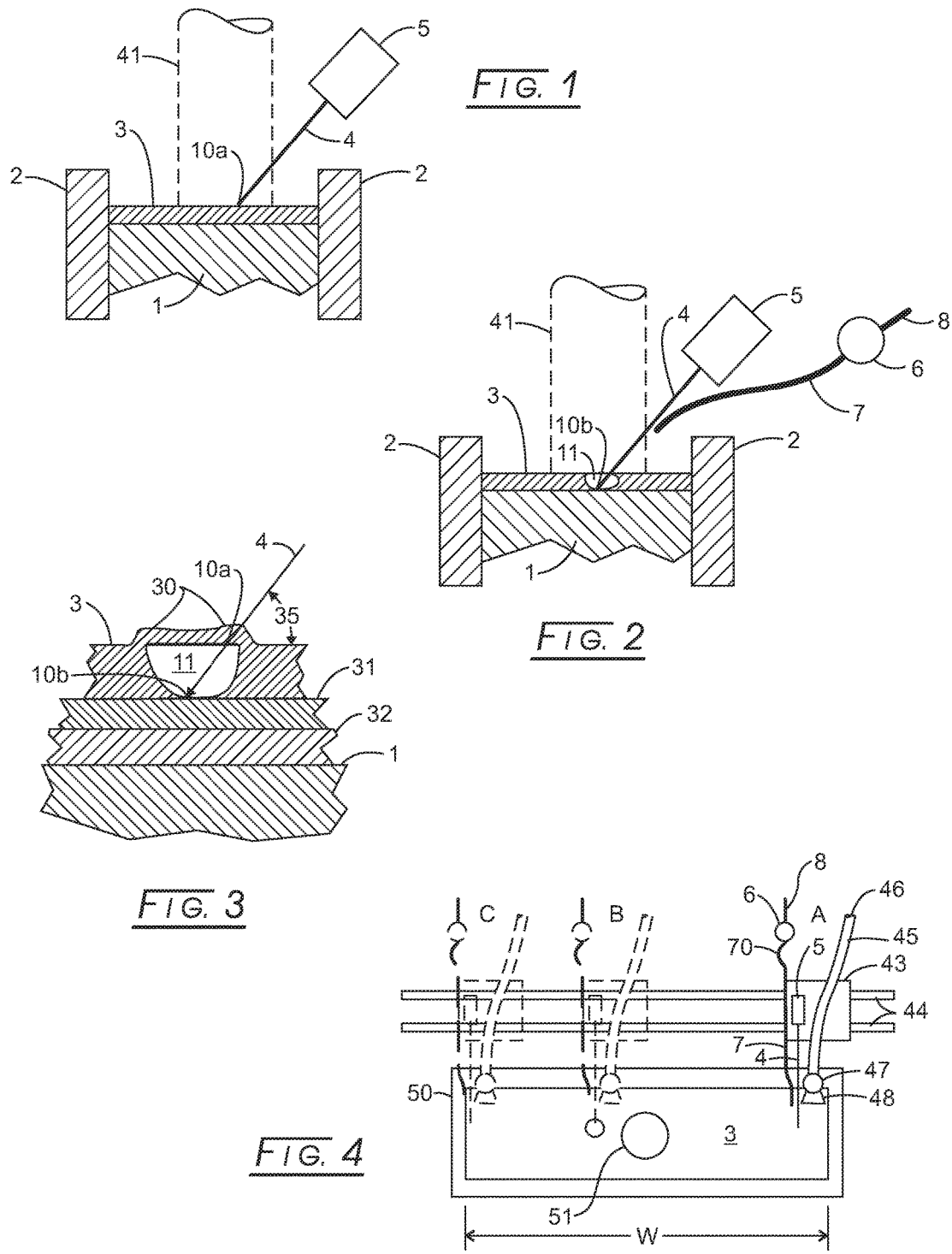

USE OF A LASER MEASURING SYSTEM AND A PULSE GAS FLOW TO ENABLE A FEEDBACK CONTROLLED MOLD POWDER APPLICATION

CROSS-REFERENCE TO RELATED APPLICATIONS

This application claims benefit of provisional application U.S. Ser. No. 62/152,986 filed Apr. 27, 2015.

STATEMENT REGARDING FEDERALLY SPONSORED RESEARCH

Not applicable.

BACKGROUND

Continuous casters in the metals industry typically pour liquid, molten metal into a mold at the top of the caster (through an SEN tube). A granular mold powder is layered atop the open caster top in order to (i) prevent oxidation (scale) at the top molten metal surface and when melted (ii) provide a side wall lubricant for the cast as it proceeds down through the caster.

The mold powder is consumed as the cast proceeds, but at different rates depending on the liquid metal flow patterns and sidewall drag. Our goal is to be able to measure the mold powder layer thickness and use the measurement to determine areas that need additional mold powder. Absent such automated measurement and application feed rate control, it is common for a human to make a thickness estimation after which the human laborer "rakes" on the appropriate powder layer at the appropriate locations as the powder is consumed. This laborer works in a location, which is both hot and dangerous. Remote control of a variable rate granular powder feeder can put the human in a more protected place, but the accurate determination of the granular powder depth across the mold top is still required.

Mold powder is consumed at a variable rate depending on the dynamics of the cast. It has been shown that simply feeding mold powder at a consistent rate will not maintain the desired powder thickness across the entire top area. Too much powder in a given area will modify the powder chemistry/sintering (creating what the industry calls "roping"); while too little powder thickness in a given area may permit the molten metal to be exposed resulting in slag production, which become defects within the cast. Too little mold powder also results in a shortage of sidewall lubricant and even the possibility of producing a catastrophic "caster breakout".

We have determined that the distance measurement obtained from a TOF (Time of Flight) laser sensor is accurate and robust when utilized to measure the top surface powder height at a specific point in the top of the continuous caster. Additionally, the TOF sensor robustly and accurately measures the height of the underlying molten flux or molten steel level absent the powder. This disclosure presents a method of utilizing either a TOF laser sensor or other small diameter beam laser distance sensor in conjunction with a novel high-pressure gas puff to determine both the granular powder depth and height of the underlying liquid layer.

We desire to provide a constant powder layer thickness using an actual granulated layer thickness measurement system capable of accurate measurement in the hostile environment atop a caster; thereby, permitting feedback control of a granular mold powder feed and distribution mechanism.

BRIEF SUMMARY

Disclosed a method of using laser sensors to measure the top surface of granular flux powder height at the top of the continuous caster. Additionally, the laser sensor measures the height of the underlying sintered or liquid flux level absent the powder. This disclosure includes a method of utilizing a laser sensor and a gas puff to determine both the granular powder depth and the level of the underlying solid or liquid layer. The granular powder depth measurement then is utilized in a mold powder deposition system to permit feedback control so as to maintain the granular powder thickness.

In particular, system to measure a powder layer thickness atop an underlying solid or liquid uses a laser distance measuring instrument having spot size of less than about 10 mm in diameter and a switchable flow of gas projected upon the powder layer effective to form a cavity sufficiently deep to expose the underlying solid or liquid and for a time sufficient to permit the laser distance measuring instrument to reach the exposed underlying solid or liquid.

BRIEF DESCRIPTION OF THE DRAWINGS

For a fuller understanding of the nature and advantages of the present invention, reference should be had to the following detailed description taken in connection with the accompanying drawings, in which:

FIG. 1 is an elevation end view of the open top in a continuous caster where a Laser distance Sensor is directed onto the top of the granular flux layer;

FIG. 2 is an elevation end view of the open top in a continuous caster where a Laser distance Sensor is directed onto a cavity in the granular flux powder created by a gas puff;

FIG. 3 presents the layers, which lie between the granulated mold powder top surface and the molten metal being cast; and FIG. 4 depicts a plan view of the caster mold top including a scanning slide mechanism, which bears the laser distance sensor, puff tube, and a mold powder application nozzle. The drawings will be described in further detail below.

DETAILED DESCRIPTION

FIG. 1 is a simplified introductory drawing of the elevation end view of the mold top. Molten steel, 1, will be located between two typically water-cooled, copper side plates, 2. The position of the SEN feed, 41, is further back in the mold. A protective granular mold powder layer, 3, is located at atop molten steel 1 and is being measured by a laser device, 5, that produces a beam, 4; thereby measuring the distance to the top of the granulated flux powder, 10a.

Laser device 5 would be translated along the mold width (into and out of the paper) to measure the top of the granulated powder level across the mold width. An appropriate scanning method will be suggested in due course.

FIG. 2 is a simplified introductory drawing of the elevation end view of the mold top. Molten steel 1 is again shown as between two typically water-cooled copper side plates, 2. A puff jet of preferably inert gas, such as argon, flows from the end of a tube, 7, creates a momentary cavity, 11, in protective granular layer 3, such that laser device 5 measures a distance its depth, 10b. As will be familiar to one skilled in the art, the puff duration to create cavity 11 can be controlled by a solenoid valve, 6, and a typically regulated feed pressure, 8. Tube 7 is preferably directed on a path, which is near parallel to laser beam 4 viewing direction.

Cavity 11 (FIG. 3) will be small (e.g., typically 1" to 2" diameter) and the cavity will be quickly filled from the surrounding granular powder layer, which is being shaken by the mold vibration. Alternatively, a tube (not shown) could be used to inject a small amount of granular fill into cavity 11 after depth 10b is determined.

FIG. 3 details layers, which lie between the granulated mold powder and the molten metal being cast. Granular top layer 3 is crater disrupted as at 30 by the gas puff from tube 7 to form cavity 11. A layer, 31, of sintered mold powder lies above a liquid mold powder layer, 32, which lies atop molten metal 1 being cast. Prior to the gas puff, the length measurement from laser device 5 using beam 4 is to a point, 10a, and after the gas puff, the length measurement is to a point, 10b. Point 10b will be the first light reflecting surface reached by beam 4 after cavity 11 is produced and typically will be at the top of the sintered layer, which does not easily move during the gas puff. Thus, the mold granular powder thickness alone is accurately determined.

If the length of laser instrument 5 incident at an angle, 35, has determined a length, La, before the gas puff and measures a length, Lb, after the gas puff, the granular powder layer depth has been determined and is to be equal to:

$$(Lb-La)*\sin(\text{angle } 35).$$

Gravity will tend keep the layers parallel under the bottom of the powder layer, so if we scan across the long dimension of the mold, we can scan the profile to the top of the granular mold powder and require only an intermittent gas puff to determine drift in length Lb. The thickness of liquid layer 32 of the mold powder and the sintered layer of mold powder 31 are commonly predicted in the mill based on the powder components, the molten metal temperature, and the continuous cast speed, but only after the granular layer thickness is known and maintained.

FIG. 4 is a plan view of the caster top of a width, W, which suggests an integration of laser instrument 5 distance and puff tube 7 into a system to maintain the thickness of granular flux layer 3. Mold sides, 50, are water cooled to contain and begin solidifying the liquid metal flowing into a SEN tube, 51.

A platform or cart, 43, is translated across the caster top on rail guides, 44 (typically by a programmable cable/motor drive system, details not shown). The position of cart 43 will be supplied to the control system by a variety of methods as are understood by one skilled in the art. Cart 43 bears laser distance instrument 5 and puff tube 7, which is fed from a flexible hose section, 70, from puff valve 6.

Cart 43 also bears a flexible granular powder feed tube or hose, 45, which terminates in a centrifugal separator, 47, and a powder dispensing nozzle, 48. This arrangement will dispense granular mold flux powder from a powder containing airstream, 46, onto granular surface 3. Typically, a variable speed auger feed controls the powder mass flow rate supplied from airstream 46. Alternatively, hose 45 could contain a flexible variable speed auger where separator 47 and nozzle 48 would not be required. Such powder feedings, as these and other approaches to powder feeding, are known by those skilled in the art. It would even be possible to carry a powder supply hopper and flow control mechanism on moving platform 43.

It will be assumed that granular powder can be supplied to the mold end of a feed tube near the position of nozzle 48 at a solid mass flow rate of FM (kg/sec) and is preferably programmable over time. Horn 48 and puff tube 7 are positioned so that they will not hit SEN tube 51, as they are translated across the mold top. Alternatively, the platform could include a lift mechanism to pass SEN tube 51. Alternatively, a multi axis robot could carry platform 43 and use complex motions to carry components 7, 5, and 48 and direct them anywhere, while avoiding SEN tube 51. It should be mentioned here that space at the top of many casters is severely limited both in available floor space and height. It also is necessary to have a way of rapidly removing all of the equipment from the mold top area in case there is a cast problem. In the system depicted in FIG. 4, the design and component weights permit the entire mold powder level maintenance system can be manually dragged out of the way.

FIG. 4 includes dotted positions, A, B, and C, of platform 43 during translation across the mold opening wherein the control system determines that a puff measurement is deemed necessary at position B to recalibrate Lb. At positions A and C, only La is measured to determine the height of granular powder above a then assumed Lb value, which is assumed to be sufficiently unchanged. A puff is not necessary at all scanned positions.

A wide variety of control options exists. These include but are not limited to:
(i) Scanning the platform from home position A to end position C, while collecting La values (profile of surface 3 elevation), here assuming that Lb is known or accurately maintained by the mill. On the return scan from position C, enable powder deposition as needed to fill the entire mold top surface 3 to a preset of La value.
(ii) Scanning the platform from home position A to end position C, while collecting La values (profile of surface 3 elevation), here assuming that Lb is known or accurately maintained by the mill. As the scan proceeds from A to C, enable powder deposition as needed to fill the entire mold top surface 3 to a preset La value based on the just measured La. Here, a return to home enables the next scan to again have La values immediately preceding the powder application.
(iii) Scanning as in (i) or (ii) above with intermittent stops or periodic puff flow to measure Lb. This method would permit a refill of a "puff craters", if puff flow is periodic during the scan.
(iv) Using scans, as above, in conjunction with a series of "slew to the need" areas. It is common for the granular powder to be consumed most at the mold ends and around the SEN. Slewing to and refilling those areas for preferential treatment with interspersed whole mold scans.

In any of these options, it will be appreciated by one skilled in control system art, that to a first order approximation, if a powder feeder mass flow rate, F1, and a nozzle width, Wn, produces depth, D1, by passing over the mold top width, W, at velocity, V1, a layer height "delta" for a single constant velocity traverse can be predicted as:

$$\text{delta}=D1*(V1/V)*(F/F1)$$

where V=the traversing velocity across the entire mold top; and
where F=the feeder powder mass flow across the entire mold top.

If a scan profile is measured as in (i) or (ii) above, the proper granular powder addition can be done on retrace by varying either the platform velocity or the feeder mass flow rate as the retrace traverse proceeds.

If the traversing is stopped (V=0), a delta height change can be produced in a width, =Wn, while stopping for:

$$t=(delta/D1)*(Wn/V1)*(F1/F)$$

The previous details assume a single beam laser distance-measuring instrument, which is preferentially a TOF (Time of Flight) device. As will be appreciated by those skilled in the art, other alternative laser distance measuring instruments may be utilized. These include, for example, (a) triangulation using a beam and camera line/or array sensor, (b) conoscopic holography, (c) structured light and cameras, or (d) modulated light. The granular layer depth measuring system disclosed here could use any of these and other laser technologies; all that is required is that the sensor can accurately measure distance using a spot size sufficiently small to fit within a granulated powder puff created cavity small enough to uncover just a small portion the mold top granular layer.

Triangulation based 3D laser scanners also are active scanners that use laser light to probe the environment. With respect to time-of-flight 3D laser scanner the triangulation laser shines a laser on the subject and exploits a camera to look for the location of the laser dot. Depending on how far away the laser strikes a surface, the laser dot appears at different places in the camera's field of view. This technique is called triangulation because the laser dot, the camera, and the laser emitter form a triangle. The length of one side of the triangle, the distance between the camera, and the laser emitter is known. The angle of the laser emitter corner also is known. The angle of the camera corner can be determined by looking at the location of the laser dot in the camera's field of view. These three pieces of information fully determine the shape and size of the triangle and give the location of the laser dot corner of the triangle. In most cases a laser stripe, instead of a single laser dot, is swept across the object to speed up the acquisition process.

We claim:

1. A system to measure a top surface of a powder layer atop an underlying solid or liquid, which comprises:
   a cart movable across the powder layer and carrying:
   (a) a laser distance measuring instrument having spot size of less than about 10 mm in diameter and;
   (c) a flexible granular powder feed tube containing a variable speed auger to control the powder mass flow rate of powder supplied from an airstream carried by the cart and responsive to the laser measured top surface of the powder layer to supply sufficient powder to maintain the top surface of the powder layer,
   wherein the cart measures on a pass across the powder layer and additional powder is supplied on a subsequent pass across the powder layer.

2. The system of claim 1, wherein the laser distance measuring instrument comprises a Time of Flight Laser Instrument.

3. The system of claim 1, wherein the powder comprises mold powder and the underlying solid or liquid comprises sintered or liquid mold powder in a continuous caster.

* * * * *